United States Patent [19]
Liao

[11] Patent Number: 5,706,900
[45] Date of Patent: Jan. 13, 1998

[54] GARDENING TOOL FOR LOOSENING SOIL

[76] Inventor: Dick Liao, 83 Hale St., Bridgewater, Mass. 02324

[21] Appl. No.: 752,715

[22] Filed: Nov. 19, 1996

[51] Int. Cl.⁶ ............................................................ A01B 1/18
[52] U.S. Cl. ........................................... 172/378; 16/111 R
[58] Field of Search ................................... 172/378, 379, 172/371; 16/111 R; 175/18; 299/24

[56] References Cited

U.S. PATENT DOCUMENTS

| | | | |
|---|---|---|---|
| 264,138 | 9/1882 | Colvin . | |
| 274,108 | 3/1883 | Connor . | |
| 409,619 | 8/1889 | Stebbins | 172/378 |
| 425,150 | 4/1890 | Stanley . | |
| 534,199 | 2/1895 | Clouse | 172/378 X |
| T875,019 | 6/1970 | Haddad et al. . | |
| 2,082,476 | 6/1937 | Allen . | |
| 2,492,035 | 12/1949 | Doble | 172/378 X |
| 2,791,879 | 5/1957 | Truran | 172/378 |
| 2,809,067 | 10/1957 | Macchi . | |
| 3,061,270 | 10/1962 | Lowe | 172/378 X |
| 3,129,771 | 4/1964 | Lidstone . | |
| 3,129,775 | 4/1964 | Connelly | 175/18 |
| 3,198,719 | 8/1965 | Stewart | 172/378 X |
| 3,415,518 | 12/1968 | Root | 172/378 X |
| 3,930,544 | 1/1976 | Foster, Sr. | 172/378 X |
| 4,286,673 | 9/1981 | Van Rooijen | 172/378 |
| 4,905,768 | 3/1990 | Lorenz | 172/378 X |
| 5,038,870 | 8/1991 | Kuronen | 175/18 |
| 5,110,123 | 5/1992 | Larson | 172/378 X |
| 5,207,466 | 5/1993 | Ohlson | 172/378 X |
| 5,435,396 | 7/1995 | Robichaux | 172/378 |
| 5,441,118 | 8/1995 | Cruz, Jr. | 172/378 |

FOREIGN PATENT DOCUMENTS 4108088  4/1992  Japan ............................. 16/111 R Primary Examiner—Terry Lee Melius
Assistant Examiner—Christopher J. Novosad
Attorney, Agent, or Firm—Fish & Richardson P.C.

[57] ABSTRACT

A gardening tool for loosening soil includes a shaft having an upper and a lower end, a longitudinal axis, and a tine having a wavy profile along its length. The tine is connected to the bottom end of the shaft and initially projects outward from the longitudinal axis of the shaft and thereafter extends in a direction that points away from the upper end of the shaft and is substantially parallel to the longitudinal axis of the shaft. The gardening tool includes a handle having a unique design which improves ease of use.

14 Claims, 5 Drawing Sheets

GARDENING TOOL FOR LOOSENING SOIL

BACKGROUND OF THE INVENTION

The invention relates to a tool for loosening and cultivating soil.

Prior to planting a garden or seeding a lawn, one generally loosens the soil so that the roots of a plant or the seed is firmly entrenched within the soil where they derive nutrients, while at the same time being protected from the weather or predators (e.g., birds). Moreover, loosening the soil allows air to more easily reach the roots or seed.

SUMMARY OF THE INVENTION

The invention features, in general, a gardening tool for loosening and cultivating soil more efficiently and with reduced effort. The gardening tool includes at least one tine having a wavy profile along its length. The tine is connected to the lower end of a shaft and initially projects outward from the longitudinal axis of the shaft and, thereafter, extends in a direction that points away from the upper end of the shaft and is parallel to the axis of the shaft.

In one embodiment, the tine has a diameter that is approximately constant along a substantial length of the tine. In this case, for example, the wavy profile is produced by having the midpoint position of the diameter oscillate along the length of the tine. In another embodiment, the midpoint position of the diameter is constant, but the diameter varies thereby producing a wavy profile. More generally, a tine having a wavy profile can have a combination of these properties, i.e. varying midpoint position and varying diameter. When the tine having a wavy profile is immersed in the soil and forced in a direction transverse to the axis of the shaft, the tine loosens the soil along a path of greater area than a tine not having a wavy profile.

Preferred embodiments may include one or more of the following features. The gardening tool can include a number of outward-projecting tines with at least one of the tines having a length along the axis of the shaft that is different than the length along the axis of the shaft of another tine. As a result, some tines will penetrate the soil more deeply than others.

The perpendicular distances of the outward-projecting tines from the shaft can also be made to vary. For example, one of the tines can have a perpendicular distance from the shaft that is different than the perpendicular distance from the shaft of every other tine. In this case, when the tines are immersed in the ground and a torque is imparted about the axis of the shaft, the tine having a different perpendicular distance follows a different circular path than other tines and therefore the area of broken ground is increased.

A central tine that extends away from the shaft along the longitudinal axis of the shaft can be included as a part of the gardening tool. The central tine anchors the tool in the ground during use.

The gardening tool can also include a handle, which is attached to the upper end of the shaft at a connection point and has a middle section and two end sections. The middle section extends outward from the shaft in two opposite directions. The two end sections each have substantially parallel axes that lie in a plane perpendicular to the axes of the shaft such that neither axis is substantially tangential to an arc of any imaginary circle having the upper end of the shaft as its center. In one embodiment, the end sections extend from the terminal ends of the middle section at obtuse angles.

A different handle for the gardening tool can include an extended middle section which is attached to said shaft at a connection point and two end sections extending upwards from the terminal ends of said middle section. The end sections each having substantially parallel longitudinal axes that are substantially parallel to the longitudinal axis of the shaft.

If a user stands parallel to the longitudinal axes of the end sections, any of the handles described above have the property that one end section is at a greater distance from the user than the other end section. The differences in distance make it easier for the user to apply a torque to the shaft, since one end section can be grasped with an extended arm, making it easier to pull, while the other end section can be grasped with a folded arm, making it easier to push. This motion can be made initially without breaking the wrists of the user.

In a different aspect, the invention features a handle for imparting a torque about the longitudinal axis of a shaft of a gardening tool. Any of the handles described above can be used in this aspect of the invention.

Other advantages and features of the invention will be apparent from the following description and from the claims.

DESCRIPTION OF THE INVENTION

Figure 1:
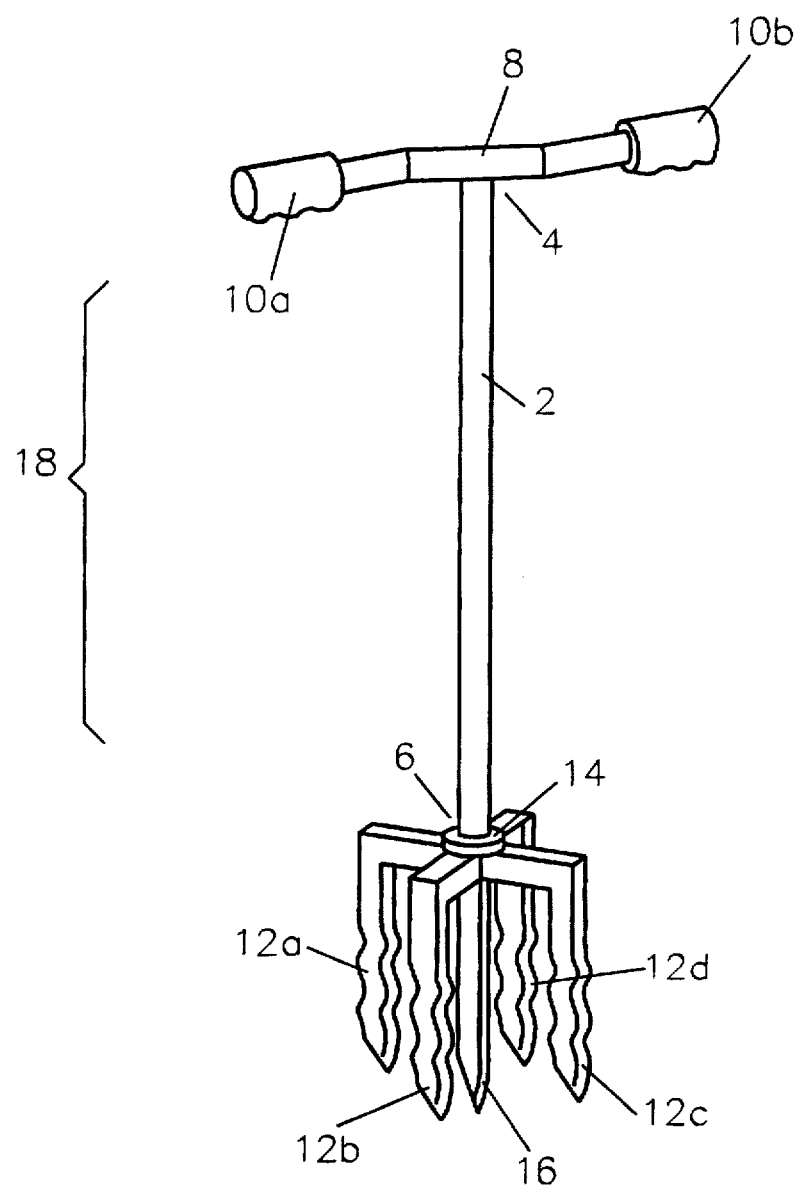
FIG. 1 is a perspective view of a gardening tool according to the invention.

Referring to FIG. 1, a gardening tool 18 for loosening soil is shown. The tool includes a vertically-disposed shaft 2. A base plate 14 is fixed to the lower end 6 of shaft 2. A number of tines 12a–12d, having circular cross-sections, are attached to base plate 14. Tines 12a–12d extend outwardly away from shaft 2 and thereafter bend downward at an angle of about ninety degrees in a direction pointing away from upper end 4 of shaft 2 and parallel to the longitudinal axis of shaft 2. There is also a central tine 16 attached to base plate 14 that extends away from upper end 4 of shaft 2 along the longitudinal axis of shaft 2. A handle 8 is connected to the upper end 4 of shaft 2 and has two hand grips 10a, 10b attached to the ends of handle 8. Handle 8 will be discussed in greater detail below.

During typical use, central and outward-projecting tines 16, 12a–12d penetrate the soil in response to a downward force applied parallel to the longitudinal axis of shaft 2. Thereafter, a torque is imparted about the longitudinal axis of shaft 2 so that outward-projecting tines 12a–12d loosen soil as they follow a circular path. Central tine 16 anchors the tool and acts as a pivot about which outward-projecting tines 12a–12d rotate.

Figure 2:
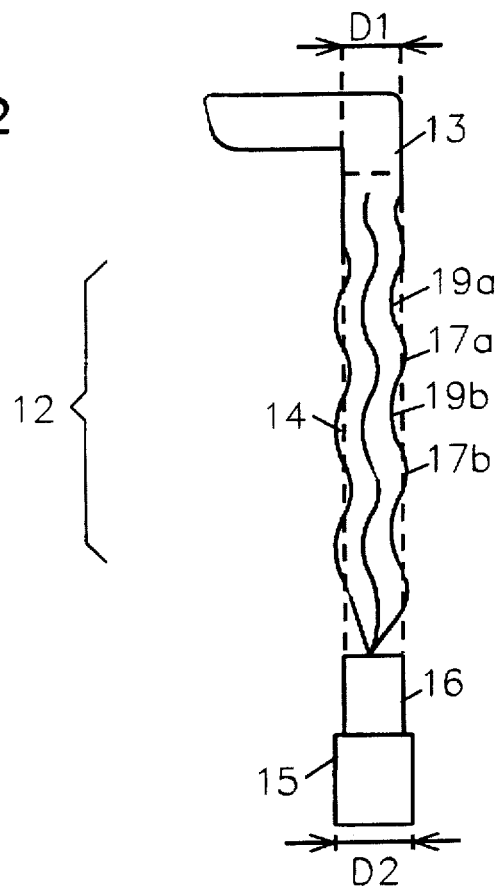
FIG. 2 is a view of the profile of an exemplary outward-projecting tine of the gardening tool in FIG. 1.

FIG. 2 shows the profile of an exemplary outward-projecting tine 12. Tine 12 does not have a straight profile but instead has a wavy profile. The diameter (denoted by the dashed line) 13 of tine 12 is constant and equal to D1 throughout the substantial length of the tine, but the midpoint position of the diameter (solid-line) 14 oscillates to produce a wavy profile. Area 16 illustrates the width of ground broken by a tine with a straight profile and diameter D1. Area 15 illustrates the larger width D2 of ground broken by a corresponding tine with a wavy profile. Since both tines have the same total volume, they displace equal amounts of soil, however the wavy tine displaces alternating layers of soil (for example soil regions removed by edges 17a and 17b of tine 12) and remaining layers are broken by their own weight (for example soil regions adjacent to edges 19a and 19b of tine 12). Therefore tines with wavy profiles break soil more efficiently.

Figure 3:
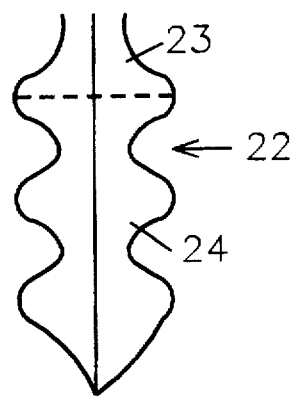
FIG. 3 is a view of the profile of another embodiment of an exemplary outward-projecting tine of the gardening tool in FIG. 1.

In a different embodiment the profile of an exemplary tine 22 may be given by FIG. 3. Again the tine has a wavy profile, but in this case the diameter of the tine 23 (denoted by the dashed line) is not constant and the midpoint position of the diameter (solid-line) 24 is constant. More generally, a tine can have a wavy profile that results from some combination of an oscillating midpoint position of the diameter (as in FIG. 2) and an oscillating diameter (as in FIG. 3).

The average diameter for a tine is typically one to four centimeters. For the embodiment illustrated in FIG. 2, in which the diameter of the tine remains constant, the midpoint position of the diameter may oscillate with an amplitude that is typically five to forty percent of the tine diameter 13. For the embodiment illustrated in FIG. 3, in which the midpoint position of the diameter remains constant but the diameter oscillates, the ratio of the maximum diameter to the minimum diameter can vary between 3:1 and 4:3. In either case, the pitch (i.e. number of oscillations per unit length of a tine) for a typical tine can vary from one cycle per ten centimeters to one cycle per two centimeters.

Figure 4:
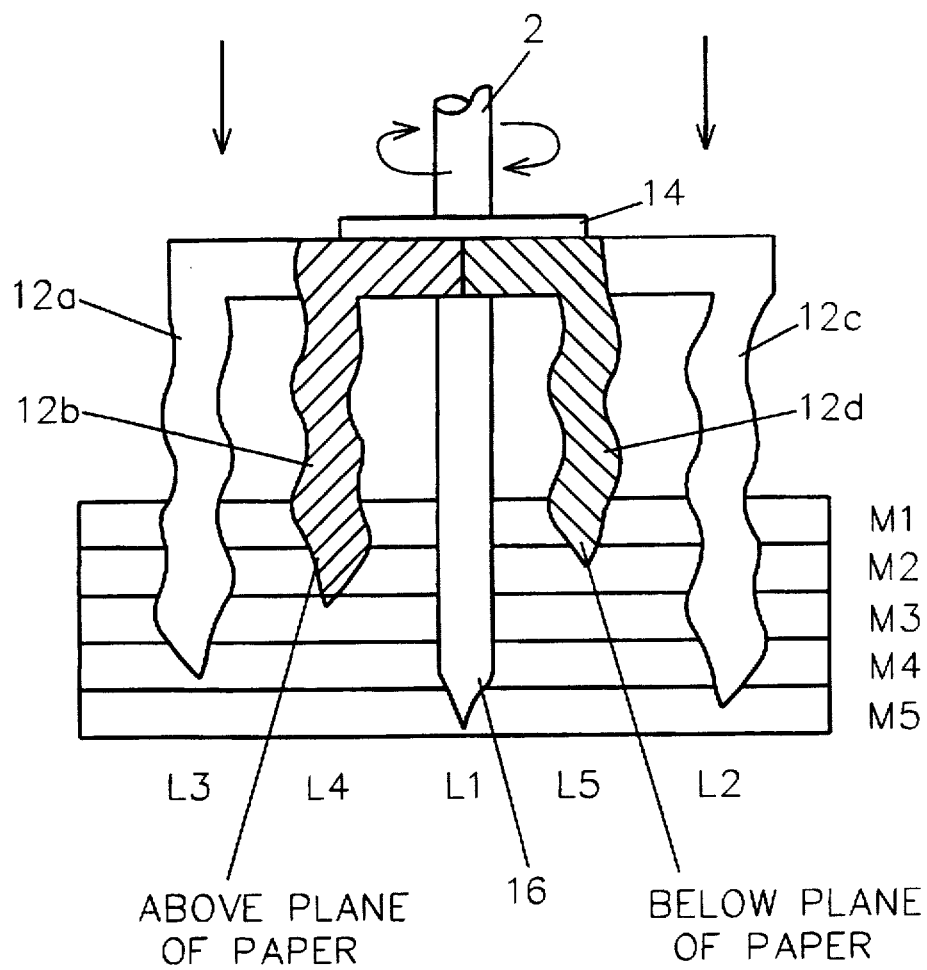
FIG. 4 is a perspective view of the lower end of the gardening tool in FIG. 1.

With reference to FIG. 4, the lower end of gardening tool 18 is shown. Following a twisting motion on the handle by the user, shaft 2, central tine 16, and outward-projecting tines 12a–12d rotate about the axis of the shaft. All outward-projecting tines 12a–12d have wavy profiles while central tine 16 has a straight profile. Tines 12b and 12d are filled in with diagonal lines in FIG. 4 to indicate that they are, respectively, above and below the plane of the paper. The tines are attached to base plate 14 which is in turn attached to shaft 2. The tines have different lengths L1–L5, where length denotes the parallel extent of a tine relative to shaft 2. Central tine 16, which anchors the gardening tool, is usually longer than the outward-projecting tines which break ground. Typically, the average tine length ranges between ten to thirty centimeters, and the differences in lengths among tines on the same tool can vary between ten to sixty percent of the average tine length. Because the tines have varying lengths, the ground is broken to varying depths M1–M5. Moreover, since not all tines penetrate the soil deeply, less effort is required to rotate the shaft.

Figure 5:
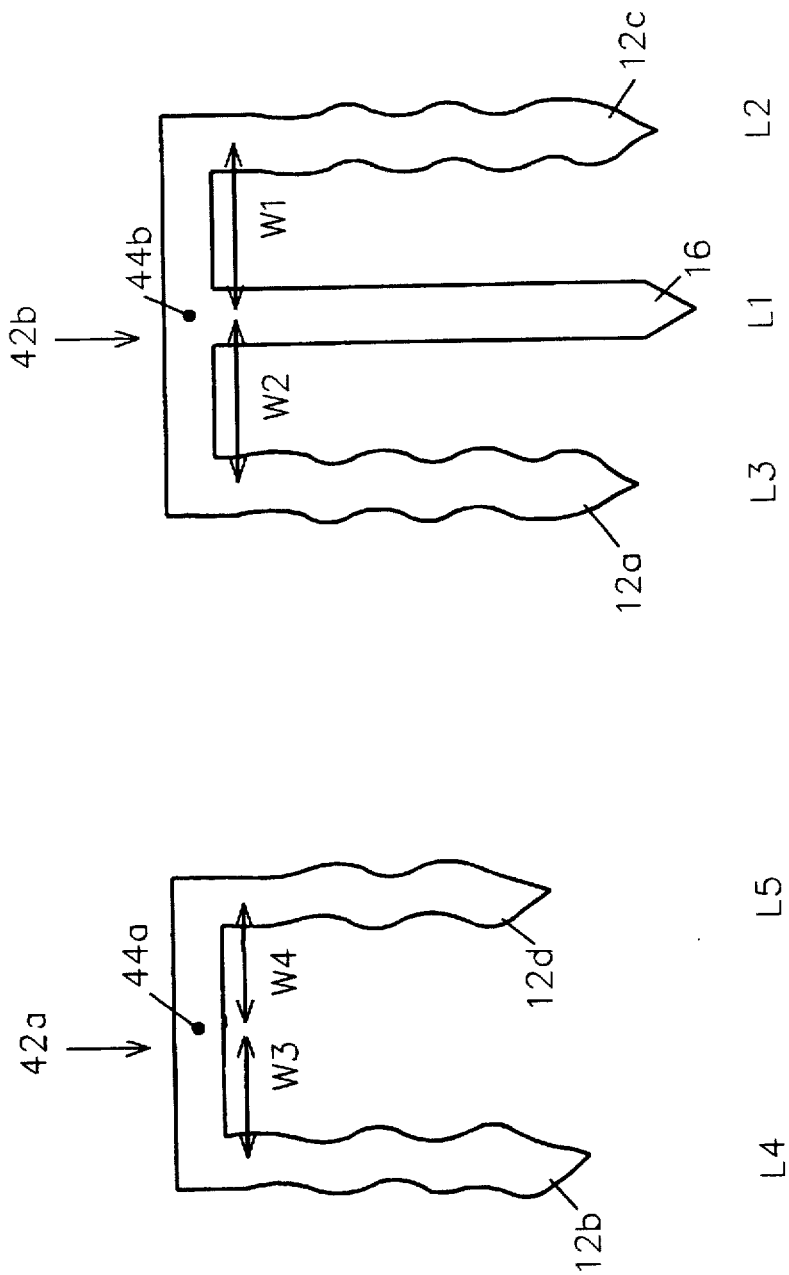
FIG. 5A is a plan view of a first tine assembly which forms part of the lower end of the gardening tool shown in FIG. 4.
FIG. 5B is a plan view of a second tine assembly which forms part of the lower end of the gardening tool shown FIG. 4.

FIGS. 5A and 5B each illustrate a tine assembly, 42a and 42b respectively. Tins assemblies 42a and 42b combine to form the lower part of the gardening tool illustrated in FIG. 4. Tine assemblies 42a and 42b each contain a lower connection point, 44a and 44b respectively, and are attached to base plate 14 such that the lower connection points lie along the longitudinal axis of shaft 2. Assembly 42a includes tines 12b and 12d spaced from connection point 44a by perpendicular distances W3 and W4, respectively. The respective lengths of tines 12b and 12d are L4 and L5. Assembly 42b includes tines 12c and 12a spaced from connection point 42b by perpendicular distances W1 and W2, respectively. Assembly 42b also includes central tine 16 with length L1. The average perpendicular distance of a tine from the shaft is typically ten to twenty centimeters, and the distances may vary between tines by about ten to sixty percent.

When tine assemblies 42a and 42b are connected to the gardening tool, the perpendicular distances of outward-projecting tines 12a–12d from shaft 2 vary. Since these distances are all different, each tine will follow a different circular path and break different regions of soil as the shaft is rotated. Therefore, more soil is broken relative to a similar gardening tool in which all outward-projecting tines are the same perpendicular distance from shaft 2.

Figure 6:
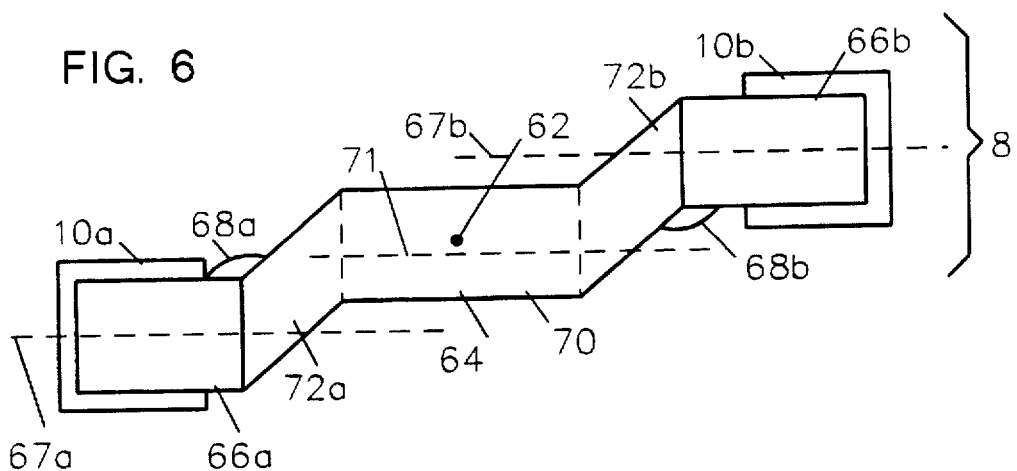
FIG. 6 is a plan view of the handle for the gardening tool in FIG. 1.

With regard to FIG. 6, handle 8 for the gardening tool is shown. Handle 8 lies in a plane that is substantially perpendicular to shaft 2 and is attached to shaft 2 at an upper connection point 62. Handle 8 can be divided into an extended middle section 64, which contains upper connection point 62, and two end sections 66a and 66b extending at obtuse angles 68a and 68b from the terminal ends of the middle section 64. The obtuse angles may vary from about one hundred and ten degrees to one hundred and sixty degrees. Each of the end sections 66a and 66b has a substantially longitudinal axis, 67a and 67b, respectively, and these axes are substantially parallel to one another. Hand grips 10a and 10b envelope end sections 66a and 66b, making them easier to grasp. Middle section 64 can be divided into a central segment 70 containing upper connection point 62, and two terminal segments 72a and 72b that extend outward in opposite directions toward the terminal ends of the middle section. Central segment 70 has a longitudinal axis 71 that is substantially parallel to longitudinal axes 67a and 67b of end sections 66a and 66b.

End sections 66a and 66b are meant to be grasped by the hands of the user. A torque is imparted to the shaft by pulling one end section (for example 66a) while simultaneously pushing the other (for example 66b). If a user stands parallel to the longitudinal axes of the end sections, the tops of the two end sections can be grasped without breaking the wrists of the user. Since the two longitudinal axes of the end sections are parallel, end section 66a is a further distance from the user than end section 66b. Therefore, end section 66a is grasped with an extended arm, making it easier to pull, while section 66b is grasped with a folded arm, making it easier to push. This motion can be performed initially without breaking the wrists of the user. The handle design maximizes user leverage and minimizes the bending of the user's wrists. These advantages can also be achieved with two different embodiments for a handle, as illustrated in FIG. 7 and FIG. 8.

Figure 7:
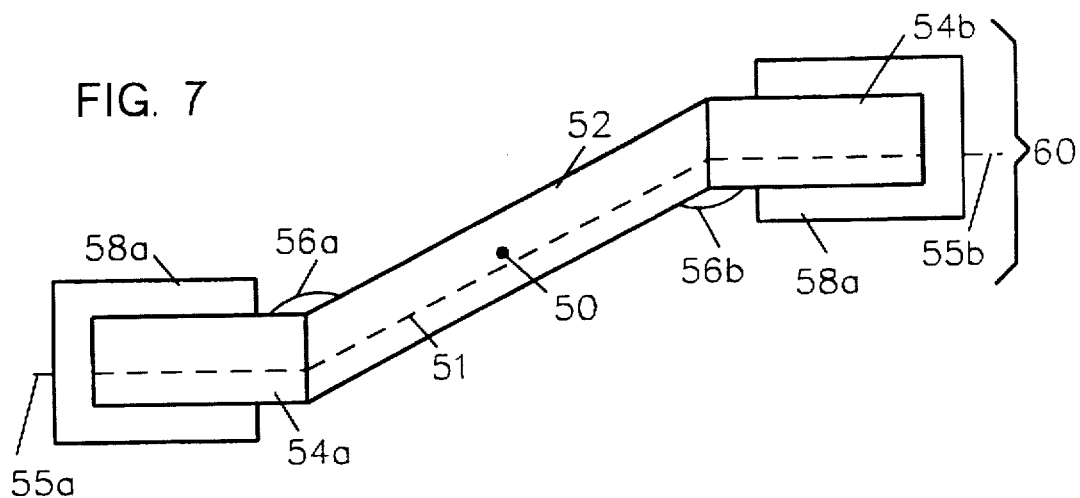
FIG. 7 is a plan view of another embodiment of the handle for the gardening tool in FIG. 1.

Referring to FIG. 7, another embodiment similar to handle 8 in FIG. 6, is shown. Handle 60 lies in a plane that is substantially perpendicular to shaft 2 and is attached to shaft 2 at an upper connection point 50. Handle 60 is divided into an extended middle section 52, which contains upper connection point 50, and two end sections 54a and 54b extending at obtuse angles 56a and 56b from the terminal ends of middle section 52. The obtuse angles may vary from about one hundred and ten degrees to one hundred and sixty degrees. However, unlike the previous embodiment, the middle section 52 has a substantially longitudinal axis 51. Each of the end sections 54a and 54b has a substantially longitudinal axis, 55a and 55b, respectively, and these axes are parallel to one another, but not parallel to axis 51 of middle section 52. Handle 60 again includes handgrips 58a and 58b which envelope end sections 54a and 56b.

Figure 8:
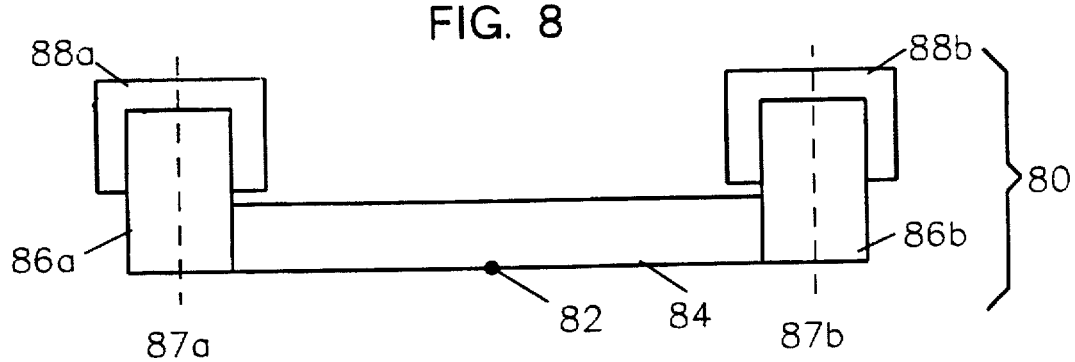
FIG. 8 is a plan view of still another embodiment of the handle for the gardening tool in FIG. 1.

In FIG. 8, a further embodiment for a handle 80 for gardening tool 18 is shown. As before, there is an extended middle section 84, containing an upper connection point 82 where shaft 2 connects to the handle 80, and two end sections 86a and 86b which extend from the terminal ends of middle section 84. End sections 86a and 86b again have substantially longitudinal axes, 87a and 87b, respectively, that are parallel to one another. However, in this embodiment the end sections 86a and 86b both turn upwards and are parallel to the longitudinal axis of shaft 2. Handle 80 again includes handgrips 88a and 88b which envelope end sections 86a and 86b.

Other embodiments are clearly within the scope of the invention. For example, outward-projecting tines 12a–12d and central tine 16 may be attached directly to lower end 6 of shaft 2 rather than be coupled to shaft 2 through base plate 14. Also, outward-projecting tines 12a–12d may curve smoothly rather than bending abruptly when initially extending away from shaft 2 and thereafter extending parallel to shaft 2. Still further, the gardening tool can include more or less than four outward-projecting tines. The handles shown in FIGS. 6–8 need not be limited for use with gardening tool 8 of FIG. 1, more generally, they may be used with any gardening tool that requires a handle to impart torque to a connected shaft.

In the above description, tines have circular cross-sections and so the diameter of a tine at a particular point along its length is well-defined. Embodiments in which tines have non-circular cross-sections, e.g., a rectangular cross-section, are also within the scope of the invention. In these cases, diameter, in the claims, is intended to mean: the width (of a tine) normal to the direction of a tine's motion when a torque is applied to the shaft.

What is claimed is:

1. A gardening tool for loosening soil comprising:
   a shaft having an upper end, a lower end, and a longitudinal axis,
   a tine having a wavy profile along its length, said tine connected to the lower end of the shaft and initially projecting outward from the longitudinal axis of the shaft and, thereafter, extending in a direction away from the upper end of the shaft and substantially parallel to the longitudinal axis of the shaft, and
   a handle that is attached to the upper end of the shaft, said handle including:
      a middle section which extends outward from the shaft in two opposite directions, and
      two end sections extending outward from terminal ends of the middle section, each end section having a longitudinal axis, said longitudinal axes of the end sections being substantially parallel to one another and lying in a plane that is substantially perpendicular to the longitudinal axis of the shaft, said longitudinal axis of each end section further oriented such that neither axis is substantially tangential to an arc of any imaginary circle having the upper end of the shaft as its center and lying in said plane, wherein said two end sections of said handle extend outward from terminal ends of the middle section at obtuse angles.

2. The gardening tool of claim 1 wherein said tine has a diameter that is substantially constant along a substantial length of the tine.

3. The gardening tool of claim 1 wherein the midpoint position of the diameter of said tine is substantially constant along a substantial length of the tine.

4. The gardening tool of claim 1 further comprising a plurality of tines, each connected to the lower end of the shaft and initially projecting outward from the longitudinal axis of the shaft and, thereafter, extending in a direction away from the upper end of the shaft and substantially parallel to the longitudinal axis of the shaft, at least one of said tines having a length along the longitudinal axis of the shaft that is different than the length along the longitudinal axis of the shaft of another tine.

5. The gardening tool of claim 4 wherein said tines project radially outward from the longitudinal axis of the shaft.

6. The gardening tool of claim 4 wherein each tine has a length along the longitudinal axis of the shaft that is different than the length along the longitudinal axis of the shaft of each of the remaining tines.

7. The gardening tool of claim 4 wherein at least one of said tines has a perpendicular distance from the shaft that is different than a perpendicular distance between the shaft and another tine.

8. The gardening tool of claim 7 further comprising a central tine connected to the lower end of the shaft and extending away from the shaft along the longitudinal axis of the shaft.

9. The gardening tool of claim 1 further comprising a plurality of tines, each connected to the lower end of the shaft and initially projecting outward from the longitudinal axis of the shaft and thereafter extending in a direction away from the upper end of the shaft and substantially parallel to the longitudinal axis of the shaft, at least one of said tines having a perpendicular distance from the shaft that is different than a perpendicular distance between the shaft and another tine.

10. The gardening tool of claim 9 wherein said tines project radially outward from the longitudinal axis of the shaft.

11. The gardening tool of claim 9 wherein each tine has a perpendicular distance from the shaft that is different than the perpendicular distance between the shaft and each of the remaining tines.

12. The gardening tool of claim 1 further comprising a central tine connected to the lower end of the shaft and extending away from the shaft along the longitudinal axis of the shaft.

13. The gardening tool of claim 1 further comprising a base plate through which said tine is connected to the lower end of said shaft.

14. A handle for imparting torque about the longitudinal axis of a connected shaft of a gardening tool comprising:
   a middle section extending outward from the shaft in two opposite directions, and
   two end sections extending outward from terminal ends of the middle section, each end section having a longitudinal axis, said longitudinal axes of the end sections being substantially parallel to one another and lying in a plane that is substantially perpendicular to the longitudinal axis of the shaft, said longitudinal axis of each end section further oriented such that neither is substantially tangential to an arc of any imaginary circle lying in said plane and having an upper end of the shaft as its center, wherein said two end sections of said handle extend outward from terminal ends of the middle section at obtuse angles.

* * * * *